Feb. 14, 1967 R. D. MYERS 3,304,019

SINGLE REEL ENDLESS TAPE OR FILM CARTRIDGE

Filed Nov. 22, 1963

INVENTOR
RICHARD D. MYERS

BY Charles R. Fay,
ATTORNEY

United States Patent Office 3,304,019
Patented Feb. 14, 1967

3,304,019
SINGLE REEL ENDLESS TAPE OR FILM CARTRIDGE

Richard D. Myers, Worcester, Mass., assignor to Marathon Products Corporation, Worcester, Mass., a corporation of Massachusetts Filed Nov. 22, 1963, Ser. No. 325,650
1 Claim. (Cl. 242—55.19)

This invention relates to a single reel endless, or self-rewinding, magnetic tape or film cartridge, and the principal object of the invention resides in the provision of means for mounting the tape for smooth and easy feeding, preventing the formation of eyes or gaps in the tape on the reel, to make it possible to play or record for a relatively long period of time without the formation of the usual eye or gap which eventually forms during the rotation of the apparatus to feed the tape from one side of the reel to the other, i.e., from the hub to the periphery of the reel during playing or recording thereof.

When tape cartridges are used with short lengths of tape, there ordinarily is no problem involved, but when long tapes are used in prior art reels and cartridges, continuous operation causes the formation of eyes or gaps in the reel, and these become larger and larger during operation and finally cause malfunction as by jamming, no matter how carefully the film is originally wound. The formation of the eyes is due to the fact that when the tape feeds back onto the outer periphery of the reel, it tends to move faster than at the hub where it is being led out from the center of the reel, because of the difference in the diameters between the center and the outer periphery of the reel.

This invention overcomes the difficulty by means of a free running hub having a free running rim or ring thereon upon which the tape is originally wound and from which it feeds to the playing area and back to the periphery of the reel, obviating the harmful effect of the tendency of the film or tape to form eyes as above stated. These eyes have been deliberately inserted in the reels at times, in the prior art, hoping to obviate the effects of the difference in speed at the hub and the periphery, but such attempts have always been unsuccessful.

A still further object of the invention resides in the provision of a device of the class described comprising a cartridge including a central fixed spindle having mounted to rotate thereabout a reel disc upon which the tape is mounted more or less as usual, in combination with a free running hub on the spindle and a free running annular rim or ring on the periphery of the hub, both the hub and the rim being free of each other and of the reel disc but being supported on the reel disc, and the rim having a special peripheral conformation to assist in leading the tape smoothly outwardly therefrom to the area where the playing or recording apparatus is located.

Other objects and advantages of the invention will appear hereinafter.

Reference is to be had to the accompanying drawings, in which.

Figure 1:
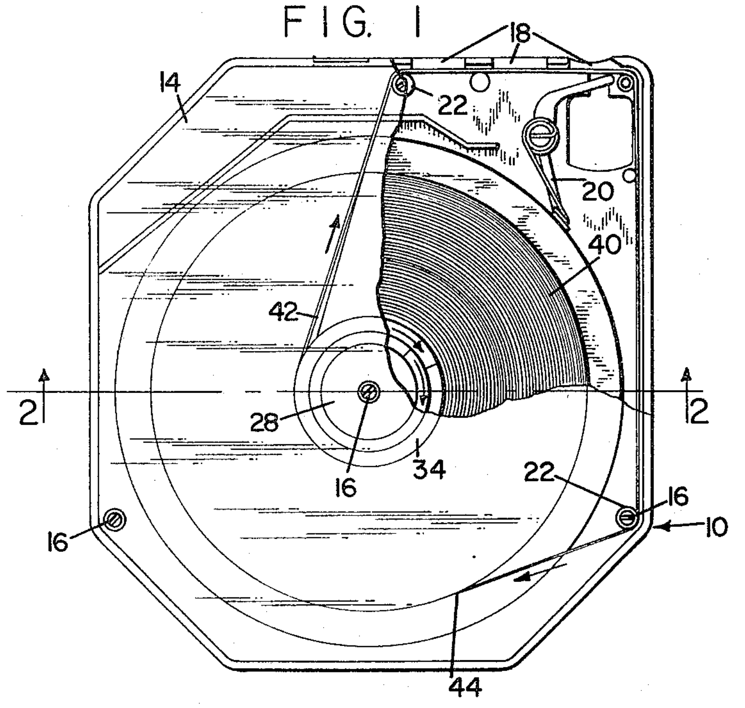
FIG. 1 is a plan view illustrating the invention, parts being broken away.

The embodiment of the invention shown herein is illustrated as applied to a cartridge for use on recording-playback instruments for recording music, voices or the like, or for the reproduction of such sounds previously recorded as will be readily understood by those skilled in the art. The cartridge is indicated generally by the reference numeral 10 and may comprise in general a lower portion which is a flanged bottom wall 12 and a top portion or cover 14. The cover 14 is removable in order to apply the reel apparatus and tape or film to the cartridge and also the cover is preferably of clear plastic. It may be secured with relation to the bottom wall 12 by any desired or conventional means such as the screws shown at 16. This construction forms a flat generally rectangular enclosure, it being noted however that one wall is provided with openings as at 18 for the application thereto of the recording and playing apparatus forming no part of the present invention but which in general is usually provided with pressure means for bearing on the tape in order to cause the same to travel as desired. Various other well known parts may be utilized as for instance reel disc brake 20, various free running pulleys 22, etc., and other well known parts ordinarily found in devices of the nature disclosed herein.

Generally centrally of the bottom wall 12 there is an upstanding fixed spindle indicated by the reference numeral 24. About this spindle there is provided a generally circular reel disc 26 which is a flat plate having a central aperture fitting over the spindle 24 and which is freely rotatable relative to the bottom wall 12. In the prior art this disc has sometimes been provided with anti-friction means between itself and the bottom wall, these having been omitted here as unnecessary and also as not forming part of the invention.

Figure 2:
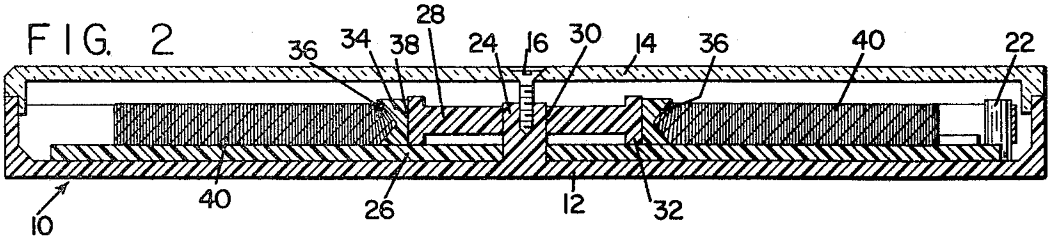
FIG. 2 is a sectional view on enlarged scale on line 2—2 of FIG. 1.

There is provided an annular free running hub 28 having the central aperture which is indicated at 30 in FIG. 2 which receives the spindle 24. The hub is free running with respect to the spindle 24 and also with respect to the reel disc 26, and rests on the reel disc 26 at the periphery of the hub as for instance indicated by the reference numeral 32 in FIG. 2.

Freely mounted to rotate about the periphery of the hub 28 there is provided a ring, rim, or collar generally indicated by the reference numeral 34. This ring is free of the hub 28 but is provided with a reasonably good fit on the periphery of the hub so as to rotate about it without vibration, and this ring also rests on the upper surface of the reel disc 26.

The outer periphery of the ring 34 is provided with a circumferential V-shape shown at 36, 36 in FIG. 2. This V shape extends completely about the ring. The inner periphery of the free running ring 34 is a cylindrical surface bearing at 38 on the like outer periphery surface of the hub 28.

The coil of film generally indicated at 40 is wound on the ring and as shown at 42 in FIG. 1 it feeds off the ring at an angle with respect to the way in which it is wound. It thus feeds more smoothly from the upper inclined surface of the V-shaped periphery (see FIG. 2), and thence to various pulleys past the openings 18, etc., and back to the outer periphery as is indicated at 44 in FIG. 1 and as shown by the direction of the arrows.

Figure 3:
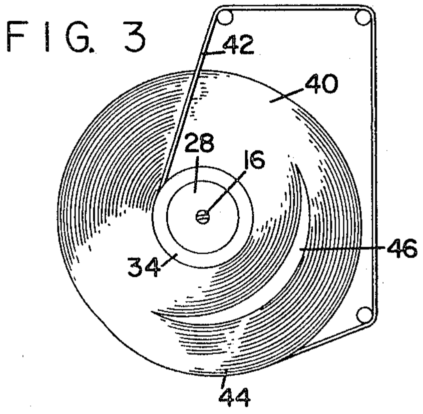
FIG. 3 is a diagrammatic view showing the eye or gap found in prior art tape cartridges.

In the absence of this novel combination of parts, i.e., the free running hub and the free running ring on the periphery thereof, the tape has been found in use to form a very pronounced eye or gap such as is shown at 46 in the diagrammatic view in FIG. 3. This gap gradually enlarges and causes the reel of tape to bulge outwardly and finally this gets big enough to cause the machine to jam and to cease operating so that the tape becomes useless and must be discarded.

It has been found in the prior art that if the free running hub is used, the effect is substantially as bad as though the free running hub were not present and the proper operation of the reel for hundreds of hours without the formation of the eye and the gap is dependent upon a differential motion between the hub and the ring. In FIG. 1 there are shown two radial marks, one on the hub 28 and one on the ring 34, which indicate the fact that the ring will rotate slightly faster than the hub as the tape is being drawn off. This allows for a differential motion which provides the correct differential to accommodate the difference of diameters of the ring and the reel of tape, so that the film feeds in-and-out completely smoothly for hour after hour of smooth operation.

Also in the prior art the tape has been thought to be necessarily lubricated to prevent friction between the various layers of the film on the reel, but with the free-running ring or rim of the present invention, this lubrication can be done away with. Even poor tape is actuated freely and symmetrically whereas in the prior art the very best tape had to be used and even then the eye described above would continually appear and cause disruption in service as to the feeding of the tape.

It is to be realized that there is no feeding mechanism involved in the cartridge because the tape is fed by extraneous means, and that is why the spindle 24 can be fixed but the disc 26, hub 28 and ring 34 are all freely rotatable both with respect to the rest of the cartridge and to each other.

It will be apparent from the above therefore that a very simple but efficient tape or film cartridge has been produced by this invention which can handle as long lengths of tape as may be required without the necessity of interruption to the operation of the machine due to the gap already described. The endless tape or film is so mounted that it has free unrestricted movement, eliminating troublesome piling up or gapping of the tape, which heretofore very often happened during the operation of the reel. Lubrication is done away with as also are certain anti-friction devices which are now found not to be necessary in the new cartridge.

Having thus described my invention and the advantages thereof, I do not wish to be limited to the details herein disclosed, otherwise than as set forth in the claim, but what I claim is:

A single reel cartridge for holding and feeding tape-like material in endless form and wound in a coil of many convolutions, comprising a housing having spaced top and bottom walls, a generally central spindle extending transversely with respect to said walls, a generally flat free reel disc mounted to rotate on the spindle adjacent to said bottom wall, hub rotatably mounted on said spindle to rotate thereabout, and a ring rotatable on and in generally closely associated relation with respect to the periphery of said hub, the tape being wound directly on the periphery of said ring in a plurality of convolutions and being led directly from the periphery of the ring to a point outside the periphery of the coil and back to the periphery of the coil, the disc, hub and ring being concentric, the hub and the ring resting on the disc, and the hub and ring being freely rotatable relative to the disc.

References Cited by the Examiner

UNITED STATES PATENTS

| | | | |
|---|---|---|---|
| 3,027,112 | 3/1962 | Flan | 242—55.19 X |
| 3,030,041 | 4/1962 | Cousino | 242—55.19 |
| 3,241,781 | 3/1966 | Knox | 242—55.19 |
| 3,245,630 | 4/1966 | Morris et al. | 242—55.19 |

FRANK J. COHEN, *Primary Examiner.*

B. S. TAYLOR, *Assistant Examiner.*